United States Patent
Miyagano et al.

(10) Patent No.: US 9,260,136 B2
(45) Date of Patent: Feb. 16, 2016

(54) VEHICLE LOWER PORTION STRUCTURE

(71) Applicant: TOYOTA JIDOSHA KABUSHIKI KAISHA, Toyota-shi (JP)

(72) Inventors: Satoru Miyagano, Okazaki (JP); Kenji Sato, Ichinomiya (JP); Tsutomu Nishikawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/571,779

(22) Filed: Dec. 16, 2014

(65) Prior Publication Data

US 2015/0197284 A1  Jul. 16, 2015

(30) Foreign Application Priority Data

Jan. 14, 2014 (JP) .................................. 2014-004600

(51) Int. Cl.
*B62D 25/08* (2006.01)
*B62D 21/15* (2006.01)

(52) U.S. Cl.
CPC .................................... *B62D 21/155* (2013.01)

(58) Field of Classification Search
CPC .............................. B62D 21/152; B62D 21/155
USPC .................. 296/187.09, 204, 193.09, 203.02; 280/784
See application file for complete search history.

(56) References Cited

U.S. PATENT DOCUMENTS

| | | | | |
|---|---|---|---|---|
| 5,984,403 A * | 11/1999 | Kuroda | ................ | B62D 21/152 |
| | | | | 280/784 |
| 6,880,663 B2 * | 4/2005 | Fujiki et al. | .................... | 180/232 |
| 6,938,948 B1 * | 9/2005 | Cornell et al. | ........... | 296/187.09 |
| 7,147,275 B2 * | 12/2006 | Matsuyama et al. | ..... | 296/203.02 |
| 7,213,873 B2 * | 5/2007 | Murata et al. | ................. | 296/204 |
| 7,762,619 B2 * | 7/2010 | Baccouche et al. | ...... | 296/187.09 |

(Continued)

FOREIGN PATENT DOCUMENTS

| | | |
|---|---|---|
| EP | 1 225 072 A2 | 7/2002 |
| EP | 1 281 603 A2 | 2/2003 |

(Continued)

OTHER PUBLICATIONS

Extended European Search Report issued Jun. 12, 2015 in Patent Application No. 14200296.3.

*Primary Examiner* — Pinel Romain
(74) *Attorney, Agent, or Firm* — Oblon, McClelland, Maier & Neustadt, L.L.P.

(57) ABSTRACT

The present invention provides a vehicle lower portion structure having: a vehicle skeleton member that extends along a vehicle longitudinal direction at a vehicle transverse direction outer side of a vehicle front portion; a sub-frame that is provided at a vehicle lower side of the vehicle skeleton member, and that has a side portion extending in the vehicle longitudinal direction; plural joining members that join the side portion of the sub-frame to the vehicle skeleton member at two or more locations in the vehicle longitudinal direction; and a rotating mechanism that is provided at a mounting portion of a front side joining member that, among the plural joining members, is positioned at a front side in the vehicle longitudinal direction, and, when a load from a vehicle front side is applied to the vehicle skeleton member, the rotating mechanism rotates the front side joining member such that an upper side in a vehicle vertical direction of the mounting portion moves relatively toward a vehicle rear side as compared with a lower side thereof.

9 Claims, 7 Drawing Sheets

(56) References Cited

U.S. PATENT DOCUMENTS

| | | | |
|---|---|---|---|
| 7,815,245 B2 * | 10/2010 | Hiraishi | B60R 19/12 293/155 |
| 7,832,748 B2 * | 11/2010 | Cariou | B62D 21/11 180/299 |
| 8,118,349 B2 * | 2/2012 | Kihara | B62D 21/152 296/187.09 |
| 8,523,273 B2 * | 9/2013 | Yoshida | B62D 21/152 293/132 |
| 2002/0096384 A1 * | 7/2002 | Yoshida | B60K 5/12 180/298 |
| 2003/0025359 A1 * | 2/2003 | Takahashi | B62D 21/155 296/203.02 |
| 2003/0075951 A1 * | 4/2003 | Hanakawa et al. | 296/188 |
| 2006/0255625 A1 * | 11/2006 | Kitoh | B62D 21/155 296/204 |
| 2012/0049571 A1 * | 3/2012 | Katou et al. | 296/187.09 |

FOREIGN PATENT DOCUMENTS

| | | |
|---|---|---|
| EP | 1 710 152 A2 | 10/2006 |
| JP | 11-171046 | 6/1999 |
| JP | 2003-040141 A | 2/2003 |
| JP | 2005-219609 | 8/2005 |
| JP | 2006-240325 | 9/2006 |
| JP | 2009-179245 | 8/2009 |
| JP | 2013-156296 | 8/2013 |
| WO | WO2007010157 A2 * | 1/2007 |

* cited by examiner

VEHICLE LOWER PORTION STRUCTURE

CROSS-REFERENCE TO RELATED APPLICATION

This application is based upon and claims the benefit of priority of the prior Japanese Patent Application No. 2014-004600, filed on Jan. 14, 2014, the entire contents of which are incorporated herein by reference.

FIELD

The embodiments discussed herein are related to a vehicle lower portion structure.

BACKGROUND

Patent Document 1 (Japanese Patent Application Laid-Open (JP-A) No. H11-171046) discloses a structure in which a sub-frame (a suspension member) and a main frame are joined at the front side and the rear side in the vehicle longitudinal direction. In this structure, a bracket that joins the sub-frame and the main frame at the rear side is provided, and a slit is formed in the bracket so that the sub-frame can move toward the vehicle rear side relatively with respect to the main frame. Due thereto, at the time of a vehicle front collision, the sub-frame is made to drop-down from the open portion at the rear end of the slit formed in the bracket.

In the structure disclosed in Patent Document 1 (JP-A No. 11-171046), the slit for causing the sub-frame to fall-out is formed in the bracket that joins the front sub-frame and the main frame at the rear side. However, a structure for facilitating dropping-out of the sub-frame is not provided at the joined portion that joins the front sub-frame and the main frame at the front side. Therefore, at the time of a vehicle front collision or at the time of a vehicle oblique collision, there is the possibility that the sub-frame will not be able to easily fall-out from the main frame.

In consideration of the above-described circumstances, an object of the present invention is to obtain a vehicle lower portion structure in which, at the time of a vehicle front collision or at the time of a vehicle oblique collision, efficiently rotates the rear portion side of a sub-frame toward the vehicle lower side with respect to a vehicle skeleton member.

SUMMARY

A vehicle lower portion structure of a first aspect has: a vehicle skeleton member that extends along a vehicle longitudinal direction at a vehicle transverse direction outer side of a vehicle front portion; a sub-frame that is provided at a vehicle lower side of the vehicle skeleton member, and that has a side portion extending in the vehicle longitudinal direction; a plurality of joining members that join the side portion of the sub-frame to the vehicle skeleton member at two or more locations in the vehicle longitudinal direction; and a rotating mechanism that is provided at a mounting portion of a front side joining member that, among the plurality of joining members, is positioned at a front side in the vehicle longitudinal direction and, when a load from a vehicle front side is applied to the vehicle skeleton member, the rotating mechanism rotates the front side joining member such that an upper side in a vehicle vertical direction of the mounting portion moves relatively toward a vehicle rear side as compared with a lower side thereof.

In a vehicle lower portion structure of a second aspect, in the vehicle lower portion structure of the first aspect, the rotating mechanism is structured such that a vehicle upper portion side at the mounting portion projects toward a vehicle longitudinal direction front side as compared with a vehicle lower portion side.

In a vehicle lower portion structure of a third aspect, in the vehicle lower portion structure of the second aspect, the rotating mechanism is structured such that a vehicle lower portion side at the mounting portion is bent in an L-shape as seen in a vehicle side view.

In a vehicle lower portion structure of a fourth aspect, in the vehicle lower portion structure of any one aspect of the first aspect through third aspect, the mounting portion has, at a vehicle lower portion side, a reinforcing portion that extends toward a vehicle rear side, and the reinforcing portion is superposed on a bottom surface portion of the vehicle skeleton member.

In a vehicle lower portion structure of a fifth aspect, in the vehicle lower portion structure of the first aspect, the front side joining member has a collar to which is fastened a bolt for attaching the side portion of the sub-frame to the vehicle skeleton member, and a bracket that attaches the collar to the vehicle skeleton member, and the rotating mechanism is provided at the bracket.

In a vehicle lower portion structure of a sixth aspect, in the vehicle lower portion structure of the fifth aspect, the rotating mechanism has an upper side bent portion that is bent toward a vehicle front side from an upper end portion of a vertical wall of the bracket and is joined to the vehicle skeleton member, and a lower side bent portion that is bent toward a vehicle rear side from a lower end portion of the vertical wall of the bracket and is joined to the vehicle skeleton member.

In a vehicle lower portion structure of a seventh aspect, in the vehicle lower portion structure of the first aspect, the front side joining member has a collar that is joined to the vehicle skeleton member and to which is fastened a bolt for attaching the side portion of the sub-frame to the vehicle skeleton member, and the rotating mechanism is provided at an upper portion side and a lower portion side of the collar.

In a vehicle lower portion structure of an eighth aspect, in the vehicle lower portion structure of the first aspect, the rotating mechanism has an upper side mounting portion that is provided so as to contact or be adjacent to a vehicle front side of an upper end portion of the collar, and that is joined to the vehicle skeleton member, and a lower side mounting portion that is provided so as to contact or be adjacent to a vehicle rear side of a lower end portion of the collar, and that is joined to the vehicle skeleton member.

In accordance with the vehicle lower portion structure of the first aspect, the sub-frame, that has the side portion that extend in the vehicle longitudinal direction, is provided at the vehicle lower side of the vehicle skeleton member that extend along the vehicle longitudinal direction. The side portion of the sub-frame is joined to the vehicle skeleton member by the plural joining members at two or more places in the vehicle longitudinal direction. The rotating mechanism is provided at the mounting portion of a front side joining member that is positioned at a front side in the vehicle longitudinal direction among the plural joining members. Due thereto, when load from the vehicle front side is inputted to the vehicle skeleton member, due to the rotating mechanism that is provided at the mounting portion of the front side joining member, the front side joining member rotates such that the upper side in the vehicle vertical direction of the mounting portion moves toward the vehicle rear side relatively as compared with the lower side. Due thereto, stress, that rotates the rear portion side in the vehicle longitudinal direction of the sub-frame toward the vehicle lower side, can be generated at the mounting portion of the front side joining member. Therefore, the rear portion side of the sub-frame can be efficiently rotated toward the vehicle lower side with respect to the vehicle skeleton member, or the sub-frame efficiently be made to separate from the vehicle skeleton member.

In accordance with the vehicle lower portion structure of the second aspect, the rotating mechanism is structured such that the vehicle upper portion side at the mounting portion of the front side joining member projects toward the vehicle longitudinal direction front side as compared with the vehicle lower portion side. Due thereto, when load from the vehicle front side is inputted to the vehicle skeleton member, the vehicle upper portion side at the mounting portion moves toward the vehicle rear side as compared with the vehicle lower portion side. Therefore, it is easy for the front side joining member to rotate such that the vehicle upper portion side, at the mounting portion of the front side joining member, moves toward the vehicle rear side relatively as compared with the vehicle lower portion side. Therefore, the vehicle upper portion side can be rotated toward the vehicle rear by a simple structure.

In accordance with the vehicle lower portion structure of the third aspect, the rotating mechanism is structured such that the vehicle lower portion side at the mounting portion of the front side joining member is bent in an L-shape as seen in a vehicle side view. Due thereto, the vehicle upper portion side of the mounting portion rotates toward the vehicle rear with the bent portion of the L-shape being the fulcrum. Therefore, an axis of rotation can be created easily at the vehicle lower portion side of the mounting portion of the front side joining member.

In accordance with the vehicle lower portion structure of the fourth aspect, the mounting portion of the front side joining member has, at the vehicle lower portion side, a reinforcing portion that extends toward the vehicle rear side, and the reinforcing portion is superposed on the bottom surface portion of the vehicle skeleton member. Due thereto, the bottom surface portion of the vehicle skeleton member can be reinforced by the reinforcing portion with respect to input from the sub-frame at the time when the vehicle travels, which contributes also to an improvement in the rigidity of the vehicle body.

In accordance with the vehicle lower portion structure of the fifth aspect, the front side joining member has the collar to which is fastened the bolt for attaching the side portion of the sub-frame to the vehicle skeleton member, and the bracket that attaches the collar to the vehicle skeleton member. The rotating mechanism is provided at the bracket. The bracket, and the collar that is mounted to the bracket, rotate such that the upper side in the vehicle vertical direction of the bracket moves toward the vehicle rear relatively as compared with the lower side. Due thereto, stress, that rotates the rear portion side in the vehicle longitudinal direction of the sub-frame toward the vehicle lower side, can be generated.

In accordance with the vehicle lower portion structure of the sixth aspect, the rotating mechanism has the upper side bent portion that is bent toward the vehicle front side from the upper end portion of a vertical wall of the bracket and is joined to the vehicle skeleton member, and the lower side bent portion that is bent toward the vehicle rear side from the lower end portion of the vertical wall of the bracket and is joined to the vehicle skeleton member. In this rotating mechanism, the upper side bent portion projects-out toward the vehicle longitudinal direction front side as compared with the vertical wall of the bracket and the lower side bent portion. Therefore, when load from the vehicle front side is inputted to the vehicle skeleton member, the bracket and the collar can be rotated such that the upper side bent portion of the bracket moves toward the vehicle rear side as compared with the lower side bent portion.

In accordance with the vehicle lower portion structure of the seventh aspect, the front side joining member has the collar that is joined to the vehicle skeleton member and to which is fastened a bolt for attaching the side portion of the sub-frame to the vehicle skeleton member. Moreover, the rotating mechanism is provided at the upper portion side and the lower portion side of the collar. Due to the rotating mechanism, the collar rotates such that the upper portion side of the collar moves toward the vehicle rear relatively as compared with the lower portion side. Due thereto, stress, that rotates the rear portion side in the vehicle longitudinal direction of the sub-frame toward the vehicle lower side, can be generated.

In accordance with the vehicle lower portion structure of the eighth aspect, the rotating mechanism has the upper side mounting portion that is provided so as to contact or be adjacent to the vehicle front side of the upper end portion of the collar, and that is joined to the vehicle skeleton member, and the lower side mounting portion that is provided so as to contact or be adjacent to the vehicle rear side of the lower end portion of the collar, and that is joined to the vehicle skeleton member. In this rotating mechanism, the upper side mounting portion projects-out toward the vehicle longitudinal direction front side as compared with the collar and the lower side mounting portion. Therefore, when load from the vehicle front side is inputted to the vehicle skeleton member, the collar can be rotated such that the upper side mounting portion moves toward the vehicle rear side as compared with the lower side mounting portion.

Further, in accordance with the vehicle lower portion structure relating to the present invention, at the time of a vehicle front collision or at the time of a vehicle oblique collision, the rear portion side of the sub-frame can be efficiently rotated toward the vehicle lower side with respect to the vehicle skeleton member.

DESCRIPTION OF EMBODIMENTS

A first embodiment of a vehicle lower portion structure relating to the present invention is described hereinafter by using FIG. 1 through FIG. 6. Arrow FR that is shown appropriately in these drawings indicates the vehicle front side, arrow UP indicates the vehicle upper side, and arrow IN indicates the vehicle transverse direction inner side.

Figure 1:
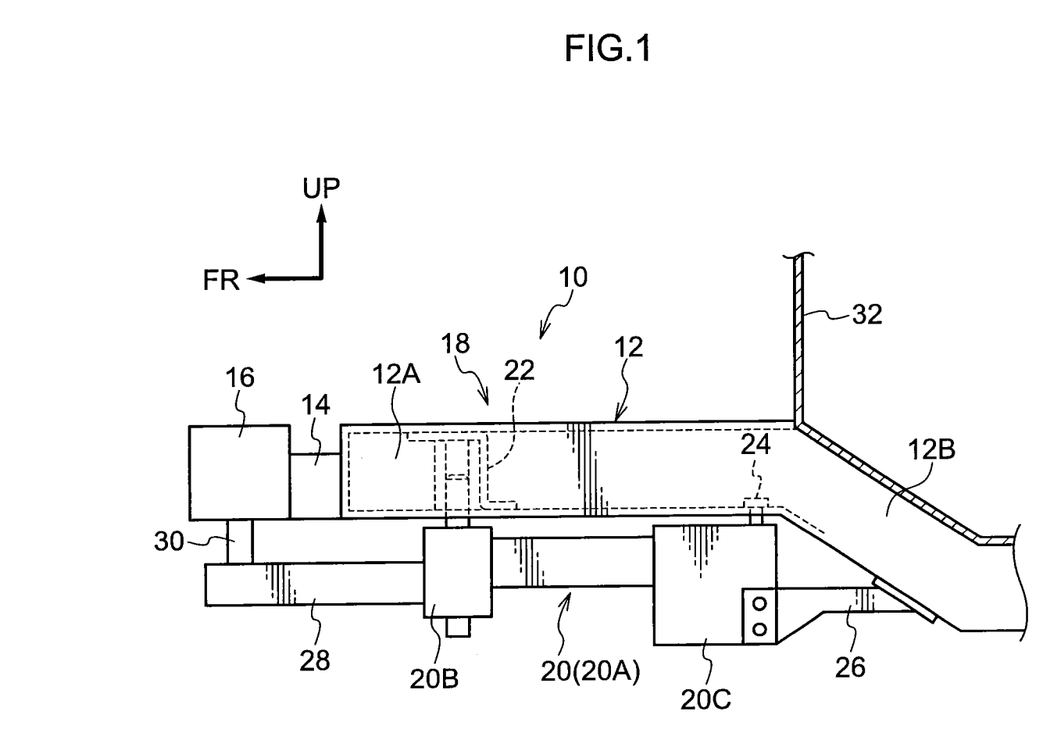
FIG. 1 is a side view showing the overall structure of a vehicle lower portion structure relating to a first embodiment.

The overall structure of a vehicle lower portion structure 18 relating to the present embodiment is shown in a side view in FIG. 1. As shown in this drawing, front side members 12, that serve as vehicle skeleton members and that extend substantially in the vehicle longitudinal direction, are provided at the transverse direction both sides (both outer sides) of the front portion of a vehicle 10 that is an automobile. A crash box 14 is provided at the vehicle front side of the front side member 12. Although not illustrated, the front side member 12 and the crash box 14 are disposed as left/right pairs at the transverse direction both end portions of the vehicle 10. The crash box 14 has a tubular portion that is disposed substantially in the vehicle longitudinal direction, and absorbs collision energy by compressively deforming in the axial direction at the time of input of collision load. A front bumper reinforcement 16, that extends substantially along the vehicle transverse direction, is provided at the vehicle front sides of the crash boxes 14 at the vehicle transverse direction both sides.

A sub-frame 20, that has side portions 20A that extend substantially in the vehicle longitudinal direction at the vehicle lower sides of the front side members 12, is provided at the lower portion side of the front portion of the vehicle 10. Although not illustrated, the sub-frame 20 is formed substantially in the shape of a hash mark as seen in a vehicle plan view, and has the pair of left and right side portions 20A that extend substantially in the vehicle longitudinal direction at the vehicle transverse direction both sides. The side portion 20A of the sub-frame 20 has, at the front end portion in the vehicle longitudinal direction, a front side mounting portion 20B. The front side mounting portion 20B of the sub-frame 20 is mounted to a front portion 12A side of the front side member 12 via a bracket 22, that serves as a joining member (front side joining member), and the like (including a collar 36 and a bolt 38 that are shown in FIG. 2 and the like).

The side portion 20A of the sub-frame 20 has, at the rear end portion in the vehicle longitudinal direction, a rear side mounting portion 20C for mounting a suspension arm. Further, an inclined portion 12B, that extends obliquely toward the lower side of the vehicle while heading toward the vehicle rear side, is provided at the rear end portion in the vehicle longitudinal direction of the front side member 12. The upper portion of the rear side mounting portion 20C of the sub-frame 20 is joined to the rear portion side in the vehicle longitudinal direction of the front side member 12 (further toward the front side than the inclined portion 12B) by a fastener 24 that serves as a joining member. In the present embodiment, the fastener 24 is structured by a bolt and a nut.

The lower portion of the rear side mounting portion 20C of the sub-frame 20 is mounted to the lower end portion of the inclined portion 12B of the front side member 12 via a brace (also called a suspension member rear frame) 26 that serves as a joining member and that is disposed substantially along the vehicle longitudinal direction. As seen in a vehicle plan view, the front end portions and rear end portions of the pair of left and right side portions 20A of the sub-frame 20 are respectively connected by a pair of front and rear connecting portions (not illustrated) that are disposed along the vehicle transverse direction. The lower portion of a dash panel 32 is mounted to the inclined portions 12B of the front side members 12, and the upper portion side of the dash panel 32 extends toward the vehicle upper side.

Figure 2:
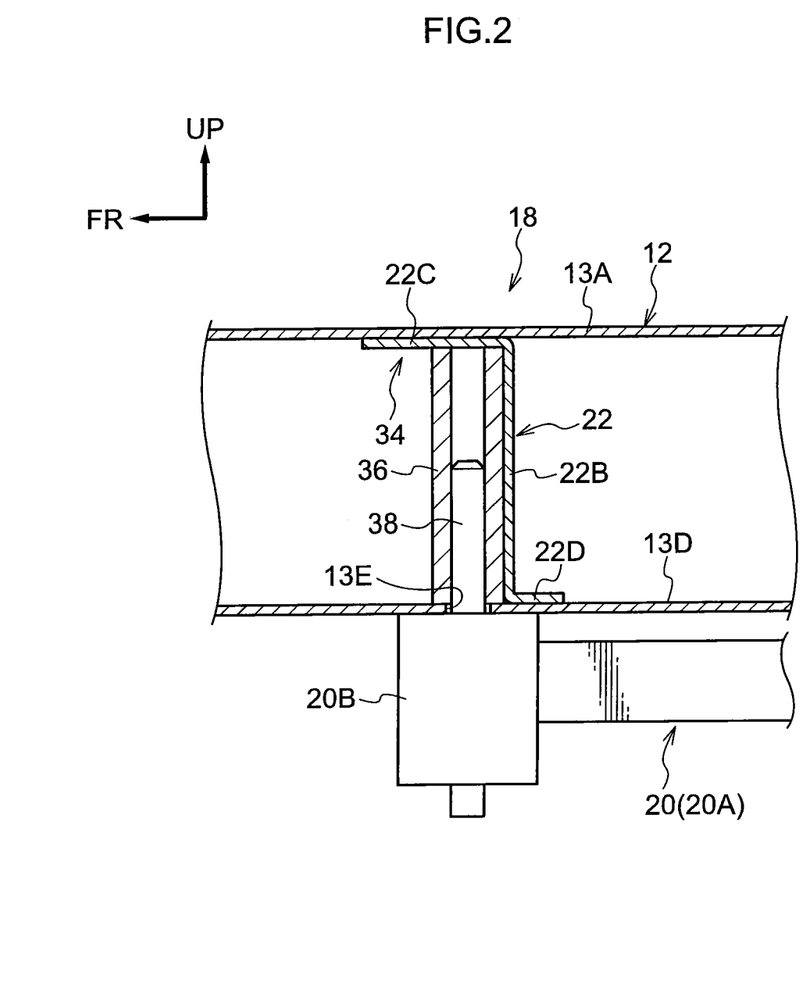
FIG. 2 is a vertical sectional view showing the vicinity of a bracket at a vehicle longitudinal direction front side that is used in the vehicle lower portion structure shown in FIG. 1.

In the vehicle lower portion structure 18 of the present embodiment, the front side mounting portion 20B and the rear side mounting portion 20C of the side portion 20A of the sub-frame 20 are joined to the front side member 12 at two or more places in the vehicle longitudinal direction (at three places in the present embodiment), by the bracket 22 (that includes the collar 36 and the bolt 38 that are shown in FIG. 2 and the like), the fastener 24 and the brace 26 that serve as plural joining members. The side portion 20A of the sub-frame 20 is made to be a structure that includes the front side mounting portion 20B and the rear side mounting portion 20C. Among these plural joining members, the bracket 22 (that includes the collar 36 and the bolt 38 that are shown in FIG. 2 and the like) structures a "front side joining member" that is positioned relatively toward the front side in the vehicle longitudinal direction. In the present embodiment, the portion where the front side mounting portion 20B of the sub-frame 20 is mounted to the front side member 12 by the bracket 22 (that includes the collar 36 and the bolt 38 that are shown in FIG. 2 and the like) structures the "mounting portion of the front side joining member".

A second member (also called a second load path) 28, that extends substantially in the vehicle longitudinal direction, is provided at the vehicle front side of the front side mounting portion 20B of the sub-frame 20. The front end portion of the second member 28 is mounted to the front bumper reinforcement 16 via a connecting portion 30.

Figure 3:
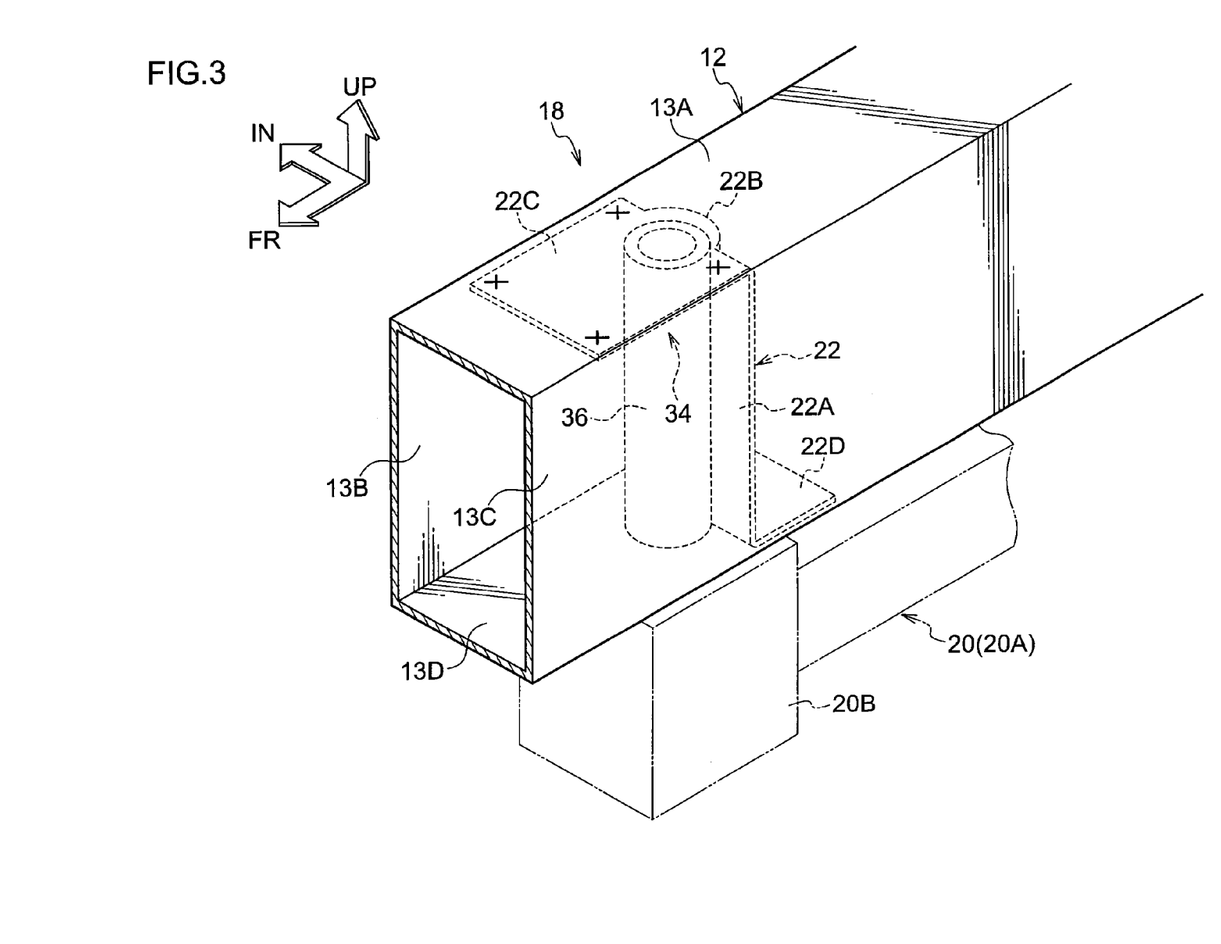
FIG. 3 is a perspective view showing the vicinity of the bracket at the vehicle longitudinal direction front side that is used in the vehicle lower portion structure shown in FIG. 1.

The vicinity of the bracket 22, that is used in the vehicle lower portion structure 18 of the present embodiment, is illustrated in a vertical sectional view in FIG. 2. The vicinity of the bracket 22 that is used in the vehicle lower portion structure 18 is shown in a perspective view in FIG. 3. As shown in FIG. 2 and FIG. 3, the front side member 12 is structured by a tubular frame whose cross-sectional shape in the vehicle longitudinal direction is hollow rectangular. More concretely, the front side member 12 has a top surface portion 13A that is disposed substantially along the vehicle longitudinal direction and substantially along the vehicle transverse direction, left and right side surface portions 13B, 13C that extend toward the vehicle lower side from the vehicle transverse direction both end portions of the top surface portion 13A, and a bottom surface portion 13D that connects the lower end portions of the side surface portions 13B, 13C and is disposed substantially along the vehicle longitudinal direction and substantially along the vehicle transverse direction (see FIG. 3).

The bracket 22 is disposed within the cross-section of the front side member 12. The bracket 22 has a vertical wall portion 22A that serves as a vertical wall and is disposed substantially along the vehicle vertical direction and substantially along the vehicle transverse direction, and a curved surface portion 22B that serves as a vertical wall and is provided at the vehicle transverse direction central portion of the vertical wall portion 22A. The curved surface portion 22B is a shape that is sunken-in a concave form toward the vehicle rear side, and the curved surface portion 22 is disposed substantially along the vehicle vertical direction. Further, the bracket 22 has an upper side bent portion 22C that serves as a vehicle upper portion side of the mounting portion and is bent toward the vehicle front side from the upper end portions of the vertical wall portion 22A and the curved surface portion 22B. Moreover, the bracket 22 has a lower side bent portion 22D that serves as a reinforcing portion and that extends toward the vehicle rear side from the lower end portions of the vertical wall portion 22A and the curved surface portion 22B. The vertical wall portion 22A and the curved surface portion 22B, and the lower side bent portion 22D, are bent in a substantial L-shape as seen in a vehicle side view, and the bent portion thereof is disposed at the vehicle lower portion side at the bracket 22 (the vehicle lower portion side at the mounting portion).

The top surface of the upper side bent portion 22C of the bracket 22 is disposed so as to be superposed with the bottom surface of the top surface portion 13A of the front side member 12. The upper side bent portion 22C of the bracket 22 and the top surface portion 13A of the front side member 12 are joined by welding (spot welding at plural places in the present embodiment). In the present embodiment, the upper side bent portion 22C of the bracket 22 is disposed at substantially the entire width in the vehicle transverse direction of the top surface portion 13A of the front side member 12.

The bottom surface of the lower side bent portion 22D of the bracket 22 is disposed so as to be superposed on the top surface of the bottom surface portion 13D of the front side member 12. The lower side bent portion 22D of the bracket 22 and the bottom surface portion 13D of the front side member 12 are joined by welding (spot welding at plural places in the present embodiment). In the present embodiment, the lower side bent portion 22D of the bracket 22 is disposed at substantially the entire width in the vehicle transverse direction of the bottom surface portion 13D of the front side member 12.

The curved surface portion 22B is formed so as to curve so as to match the shape of the outer peripheral surface of the collar (nut) 36 that is cylindrical and that serves as a front side joining member (see FIG. 3). The outer peripheral surface of the collar 36 contacts the sunken-in surface of the curved surface portion 22B, and, in this state, the collar 36 is joined by welding (arc welding in the present embodiment) to the both ends of the curved surface portion 22B of the bracket 22. A screw portion is provided at the inner side of the collar 36. Further, a through-hole 13E that is substantially circular is formed in a position of the bottom surface portion 13D of the front side member 12, which position corresponds to the collar 36 (see FIG. 2).

The bolt 38, that serves as the front side joining member and extends toward the vehicle upper side, is provided at the front side mounting portion 20B of the sub-frame 20 (see FIG. 2). The bolt 38 can rotate in a state of being passed-through the front side mounting portion 20B. The front side mounting portion 20B of the sub-frame 20 is mounted to the front side member 12 due to the bolt 38 being inserted through the through-hole 13E of the front side member 12 and being fastened together with the screw portion of the collar 36.

The front end portion of the upper side bent portion 22C, that is positioned at the upper side in the vehicle vertical direction (the vehicle upper portion side) of the bracket 22, is structured so as to project toward the vehicle longitudinal direction front side, as compared with the vertical wall portion 22A and the lower side bent portion 22D and the like that are positioned at the lower side in the vehicle vertical direction (the vehicle lower portion side) of the bracket 22. In other words, the front end portion of the upper side bent portion 22C of the bracket 22 projects-out further toward the vehicle front side than all of the other regions of the bracket 22, and the collar 36 and the bolt 38. Due thereto, at the time of a vehicle front collision or the time of a vehicle oblique collision or the like, when load from the vehicle front is inputted to the front side member 12, the upper side bent portion 22C moves toward the vehicle rear side (moves rearward) relatively as compared with the lower side bent portion 22D. Due thereto, the upper side bent portion 22C of the bracket 22 is rotated toward the vehicle rear side with the bent portion (the corner portion) of the vertical wall portion 22A and the lower side bent portion 22D at the vehicle lower portion side at the bracket 22 being the fulcrum. Namely, the mounting portion of the bracket 22 (that includes the collar 36 and the bolt 38) that joins the sub-frame 20 to the front side member 12 functions as a rotating mechanism 34 of the present embodiment.

At this time, the vertical wall portion 22A and the curved surface portion 22B, and the lower side bent portion 22D, are bent in a substantial L-shape as seen in a vehicle side view. Due thereto, it is easy for the vehicle upper portion side of the bracket 22 to rotate so as to move toward the vehicle rear side, with the bent portion (the corner portion) of the vertical wall portion 22A and the curved surface portion 22B, and the lower side bent portion 22D, being the fulcrum.

Further, due to the lower side bent portion 22D of the bracket 22 being joined by welding to the bottom surface portion 13D of the front side member 12, the bottom surface portion 13D of the front side member 12 being a single plate at the mounting portion of the bracket 22 is avoided. Due thereto, the bottom surface portion 13D of the front side member 12 is reinforced by the lower side bent portion 22D with respect to input from the sub-frame 20 at the time when the vehicle travels.

Operation and effects of the present embodiment are described next.

As shown in FIG. 1, at the vehicle lower portion structure 18 of the present embodiment, the front side member 12 and the sub-frame 20 are joined by the bracket 22 (that includes the collar 36 and the bolt 38 that are shown in FIG. 2 and the like) and the fastener 24 and the brace 26 that serve as the plural joining members, at two or more places in the vehicle longitudinal direction. The rotating mechanism 34 is provided (see FIG. 2 and FIG. 3) at the mounting portion of the bracket 22 (that includes the collar 36 and the bolt 38 that are shown in FIG. 2 and the like) that serves as the front side joining member that is positioned at the front side in the vehicle longitudinal direction among these plural joining members.

Figure 4:
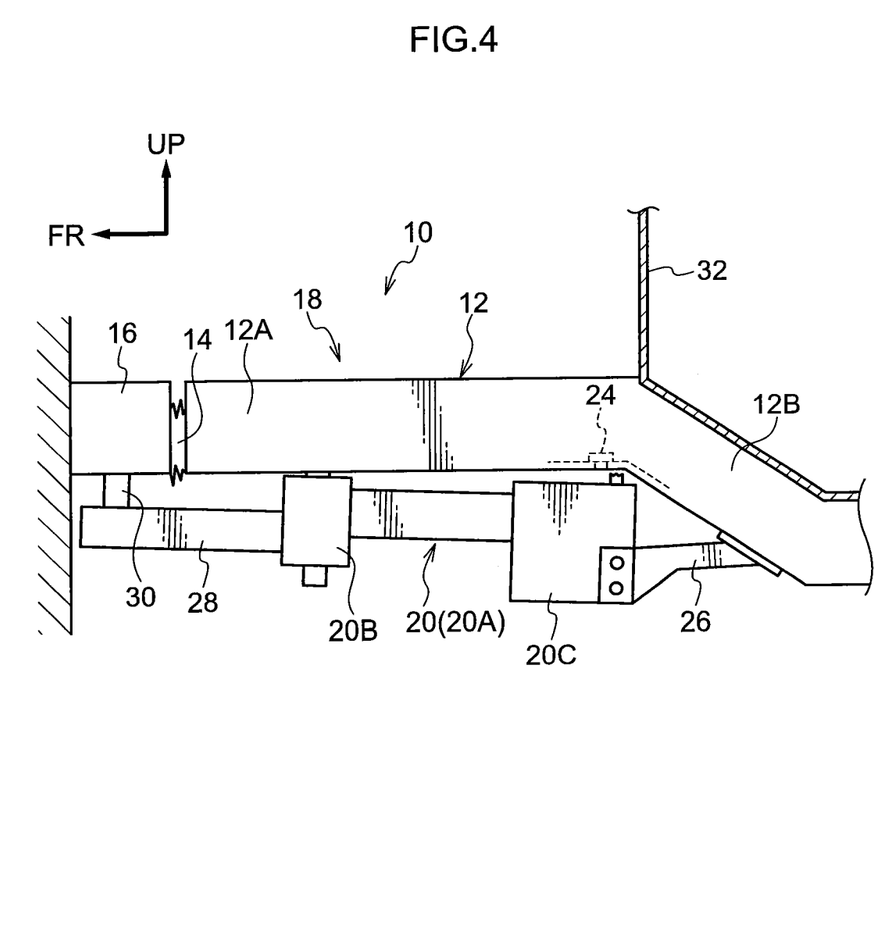
FIG. 4 is a side view showing the deformation process of the vehicle lower portion structure at the time of a vehicle front collision.
Figure 5:
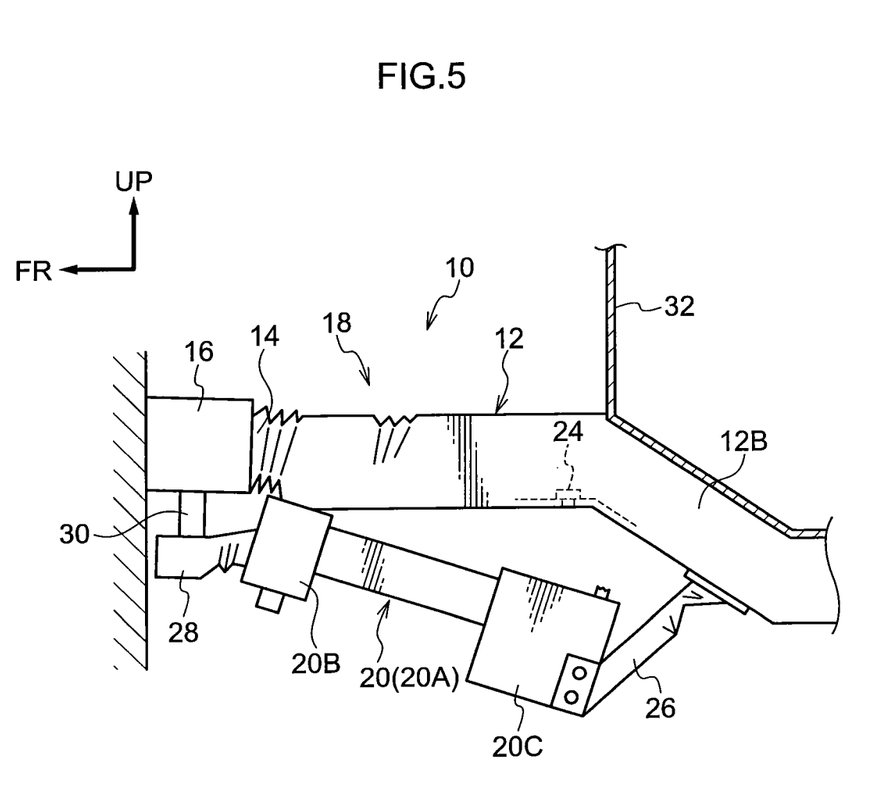
FIG. 5 is a side view showing the deformation process of the vehicle lower portion structure at the time of a vehicle front collision.

The deformation process of the vehicle lower portion structure 18 at the time of a front collision of the vehicle 10 is shown in schematic side views in FIG. 4 and FIG. 5. Namely, in FIG. 4 and FIG. 5, in order to make the deformed state of the vehicle lower portion structure 18 easy to understand, the deformed state is illustrated in a more exaggerated manner than an actual deformed state.

Figure 6:
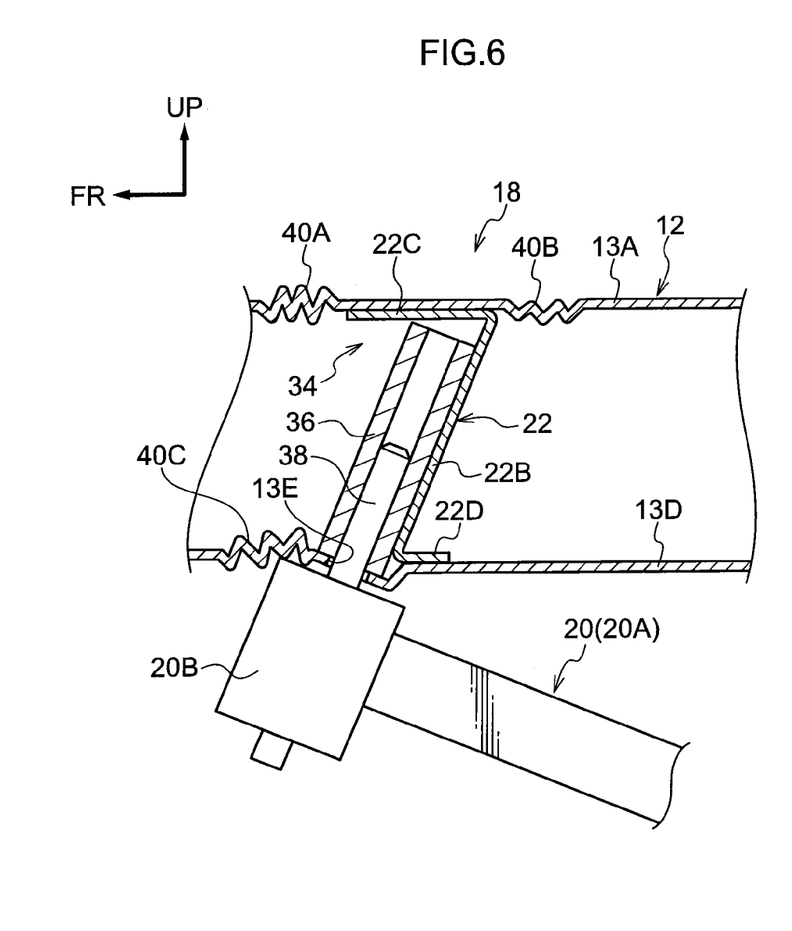
FIG. 6 is a cross-sectional view showing a deformed state of the vicinity of the bracket at the vehicle longitudinal direction front side of the vehicle lower portion structure at the time of a vehicle front collision.

As shown in FIG. 4, at the time of a front collision or the like of the vehicle 10, the crash box 14 is crushed, and load from the vehicle front side is inputted to the front side member 12. At this time, as shown in FIG. 2 and the like, the rotating mechanism 34 is provided at the mounting portion of the bracket 22 (that includes the collar 36 and the bolt 38 that are shown in FIG. 2 and the like) that is positioned at the front side in the vehicle longitudinal direction among the plural joining members that are bracket 22 and the fastener 24 (see FIG. 4) and the like. The rotating mechanism 34 of the present embodiment is structured such that the upper side bent portion 22C of the bracket 22 projects-out toward the vehicle longitudinal direction front side as compared with the vertical wall portion 22A and the curved surface portion 22B that are positioned at the lower side in the vehicle vertical direction (the vehicle lower portion side) of the bracket 22. Therefore, as shown in FIG. 6, when load from the vehicle front side is inputted to the front side member 12, the upper side bent portion 22C of the bracket 22 moves toward the vehicle rear side (moves rearward) relatively as compared with the lower side bent portion 22D. Due thereto, a moment is generated that rotates the vehicle upper portion side of the bracket 22 toward the vehicle rear side, with the fulcrum being the bent portion (the corner portion) of the vertical wall portion 22A (see FIG. 3) and the bent surface portion 22B, and the lower side bent portion 22D, at the vehicle lower portion side of the bracket 22.

Namely, as shown in FIG. 6, the upper side bent portion 22C of the bracket 22 projects-out further toward the vehicle longitudinal direction front side than the other regions at the vehicle lower portion side of the bracket 22, and than the collar 36 and the bolt 38. Due thereto, a deformation portion 40A and a deformation portion 40B arise at the front side and the rear side of the upper side bent portion 22C of the bracket 22, at the top surface portion 13A of the front side member 12. Together therewith, a deformation portion 40C arises at the front side of the lower side bent portion 22D of the bracket 22, at the bottom surface portion 13D of the front side member 12. Namely, due to the total amount of deformation in the vehicle longitudinal direction of the deformation portion 40A and the deformation portion 40B being substantially equal to the amount of deformation in the vehicle longitudinal direction of the deformation portion 40C, the upper portion side of the collar 36 that is joined to the bracket 22 falls toward the vehicle rear side (the upper portion side of the collar 36 tilts rearward with respect to the lower portion side).

Due thereto, stress that rotates the rear side mounting portion 20C (see FIG. 4), that is at the vehicle longitudinal direction rear side of the sub-frame 20, toward the vehicle lower side can be generated at the mounting portion of the bracket 22 or the like, that is at the vehicle longitudinal direction front side and that joins the sub-frame 20 and the front side member 12. Due thereto, as shown in FIG. 4 and FIG. 5, it becomes easy for the fastener 24, that fastens the front side member 12 and the upper portion of the rear side mounting portion 20C of the sub-frame 20, to break. Therefore, at the vehicle lower portion structure 18, the sub-frame 20 can be efficiently rotated toward the vehicle lower side with respect to the front side member 12, or the sub-frame 20 can efficiently be made to separate from the front side member 12.

In this vehicle lower portion structure 18, at the time of a front collision or at the time of an oblique collision or the like of the vehicle 10, by rotating the vehicle longitudinal direction rear portion side of the sub-frame 20 efficiently toward the vehicle lower side with respect to the front side member 12, the crush stroke can be ensured and the kinetic energy of the collision can be absorbed further toward the front than the cabin that is at the rear side of the dash panel 32 of the vehicle 10.

Further, at the time of a front collision or at the time of an oblique collision or the like of the vehicle 10, due to the rear side mounting portion 20C of the sub-frame 20 separating from the front side member 12, the rear side mounting portion 20C of the sub-frame 20 can be moved toward the vehicle lower side. Therefore, the behavior of the sub-frame 20 can be controlled such that the rear portion side of the sub-frame 20 does not interfere with the cabin that is further toward the vehicle rear side than the dash panel 32 of the vehicle 10.

Further, at the vehicle lower portion structure 18, the upper side bent portion 22C of the bracket 22 projects-out further toward the vehicle longitudinal direction front side than the other regions at the vehicle lower portion side at the bracket 22, and than the collar 36 and the bolt 38. Due thereto, when load from the vehicle front side is inputted to the front side member 12, the upper side bent portion 22C of the bracket 22 moves toward the vehicle rear side (moves rearward) relatively as compared with the lower side bent portion 22D. Therefore, it is easy for the vehicle upper portion side of the bracket 22 to rotate toward the vehicle rear with the fulcrum being the bent portion (the corner portion in the vehicle transverse direction) of the vertical wall portion 22A and the curved surface portion 22B, and the lower side bent portion 22D, of the vehicle lower portion side of the bracket 22.

Further, at the vehicle lower portion structure 18, as seen in a vehicle side view, the vertical wall portion 22A and the curved surface portion 22B, and the lower side bent portion 22D, of the bracket 22 are bent in a substantial L-shape. Due thereto, it is easy for the vehicle upper portion side at the bracket 22 to rotate so as to move toward the vehicle rear, with the fulcrum being the bent portion (the corner portion in the vehicle transverse direction) where the vertical wall portion 22A and the curved surface portion 22B, and the lower side bent portion 22D, are bent in a substantial L-shape. Therefore, an axis of rotation can be created easily at the vehicle lower portion side at the bracket 22.

Moreover, the bracket 22 is provided, at the vehicle lower portion side thereof, with the lower side bent portion 22D that extends toward the vehicle rear side. The lower side bent portion 22D is joined, in a superposed state, to the bottom surface portion 13D of the front side member 12. Due thereto, the bottom surface portion 13D of the front side member 12 being a single plate at the mounting portion of the bracket 22 can be avoided, and deformation of the bottom surface portion 13D at the position where the lower side bent portion 22D is provided, with respect to input from the sub-frame 20 at the time when the vehicle travels, can be suppressed. Namely, the bottom surface portion 13D of the front side member 12 can be reinforced by the lower side bent portion 22D of the bracket 22, with respect to input from the sub-frame 20 at the time when the vehicle travels, and this contributes also to an improvement in the rigidity of the vehicle body.

A second embodiment of a vehicle lower portion structure relating to the present invention is described next by using FIG. 7. Note that, in the second embodiment, structural elements, members and the like that are the same as those of the first embodiment are denoted by the same reference numerals, and detailed description thereof is omitted.

Figure 7:
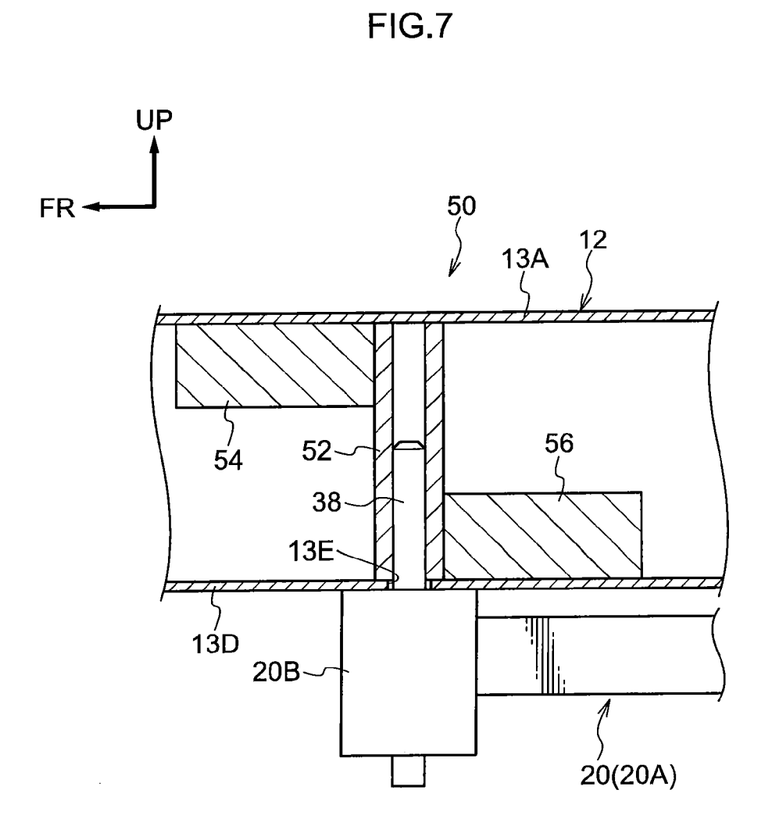
FIG. 7 is a vertical sectional view showing the vicinity of a mounting portion of a collar at the vehicle longitudinal direction front side, that is used in a vehicle lower portion structure relating to a second embodiment.

As shown in FIG. 7, in a vehicle lower portion structure 50 of the present embodiment, a collar (nut) 52, that serves as a front side joining member and that is joined to the top surface portion 13A and the bottom surface portion 13D, is provided within the cross-section of the front side member 12. The upper end portion of the collar 52 is joined to the bottom surface of the top surface portion 13A by welding or the like, and the lower end portion of the collar 52 is joined to the top surface of the bottom surface portion 13D by welding or the like. An upper side mounting portion 54, that serves as a rotating mechanism and is mounted to the top surface portion 13A of the front side member 12, is provided at the mounting portion of the upper end portion side of the collar 52. The upper side mounting portion 54 is disposed at the vehicle front side of the collar 52, and the rear end portion of the upper side mounting portion 54 contacts the front surface portion of the collar 52. The upper side mounting portion 54 is formed from a substantially rectangular block body, and is mounted by welding or fasteners or the like to the bottom surface of the top surface portion 13A of the front side member 12. The upper side mounting portion 54 is disposed substantially over the entire width in the vehicle transverse direction of the top surface portion 13A of the front side member 12.

A lower side mounting portion 56, that serves as a rotating mechanism and that is mounted to the bottom surface portion 13D of the front side member 12, is provided at the mounting portion of the lower end portion side of the collar 52. The lower side mounting portion 56 is disposed at the vehicle rear side of the collar 52, and the front end portion of the lower side mounting portion 56 contacts the rear surface portion of the collar 52. The lower side mounting portion 56 is formed from a substantially rectangular block body, and is mounted by welding or fasteners or the like to the top surface of the bottom surface portion 13D of the front side member 12. The lower side mounting portion 56 is disposed substantially over the entire width in the vehicle transverse direction of the bottom surface portion 13D of the front side member 12.

The bolt 38, that is provided at the front side mounting portion 20B of the sub-frame 20, is inserted-through the through-hole 13E of the front side member 12, and is fastened together with a screw portion of the collar 52. Due thereto, the front side mounting portion 20B of the sub-frame 20 is mounted to the front side member 12.

This vehicle lower portion structure 50 is structured such that the front end portion of the upper side mounting portion 54, that is positioned at the upper side in the vehicle vertical direction (the vehicle upper portion side) of the collar 52, projects-out toward the vehicle longitudinal direction front side as compared with the collar 52 and the lower side mounting portion 56 that is positioned at the lower side in the vehicle vertical direction (the vehicle lower portion side) of the collar 52. Due thereto, at the time of a vehicle front collision or at the time of a vehicle oblique collision or the like, when load from the vehicle front side is inputted to the front side member 12, the upper side mounting portion 54 moves toward the vehicle rear side (moves rearward) relatively as compared with the lower side mounting portion 56. Due thereto, the collar 52 rotates such that the upper side mounting portion 54 at the vehicle vertical direction upper side of the collar 52 moves toward the vehicle rear relative to the lower side mounting portion 56 at the vehicle vertical direction lower side of the collar 52. Therefore, the upper portion side of the collar 52 falls toward the vehicle rear side (the upper portion side of the collar 52 tilts rearward with respect to the lower portion side).

Due thereto, stress, that rotates the rear side mounting portion 20C (see FIG. 1) of the sub-frame 20 toward the vehicle lower side, can be generated at the mounting portion of the collar 52 that is at the vehicle longitudinal direction front side and that joins the sub-frame 20 and the front side member 12. Therefore, at the vehicle lower portion structure 50, the rear side mounting portion 20C of the sub-frame 20 can efficiently be rotated toward the vehicle lower side with respect to the front side member 12, or the rear side mounting portion 20C of the sub-frame 20 can efficiently be separated from the front side member 12.

Moreover, at the vehicle lower portion structure 50, at the lower end portion side of the collar 52, the lower side mounting portion 56 is joined, in a superposed state, to the bottom surface portion 13D of the front side member 12. Due thereto, deformation of the bottom surface portion 13D at the position where the lower side mounting portion 56 is provided, with respect to input from the sub-frame 20 at the time when the vehicle travels, can be suppressed. Namely, the bottom surface portion 13D of the front side member 12 can be reinforced by the lower side mounting portion 56, with respect to input from the sub-frame 20 at the time when the vehicle travels, and this contributes also to an improvement in the rigidity of the vehicle body.

Note that, in the vehicle lower portion structure, the rotating mechanism that is provided at the mounting portion of the front side joining member does not have to be joined to the front side joining member. It suffices for the rotating mechanism to be a structure that is such that, for example, at the time of a collision or the like, stress is applied in a direction of causing the upper side in the vehicle vertical direction of the mounting portion to move toward the vehicle rear as compared with the lower side.

Note that, in the first embodiment, the lower side bent portion 22D of the bracket 22 is bent toward the vehicle rear side from the lower end portion of the vertical wall portion 22A and the like, but the present invention is not limited to this. Namely, provided that there is a structure in which the front end portion of the upper side bent portion of the bracket 22 projects-out further toward the vehicle longitudinal direction front side than the other regions at the vehicle lower portion side at the bracket 22 and than the bolt and the collar, the direction in which the lower side bent portion 22 is bent may be changed to the vehicle front side. Namely, the lower side bent portion 22D of the bracket may be bent toward the vehicle front side, and the lower side bent portion 22D and the vertical wall portion 22A and the like of the bracket may be bent in a substantial L-shape as seen in a vehicle side view. In this case as well, the vehicle upper portion side can be rotated toward the vehicle rear with the bent portion of the bracket being the fulcrum.

Further, in the second embodiment, the lower side mounting portion 56 is provided at the vehicle rear side of the collar 52, but the present invention is not limited to this. For example, if the upper side mounting portion 54 projects-out further toward the vehicle longitudinal direction front side than the lower side mounting portion 56, there may be a structure in which the lower side mounting portion 56 is provided at the vehicle front side of the collar 52.

Further, in the first embodiment, the upper side bent portion 22C of the bracket 22 is disposed over substantially the entire width in the vehicle transverse direction of the top surface portion 13A of the front side member 12, but the present invention is not limited to this structure. For example, the upper side bent portion 22C of the bracket 22 may be a structure that is disposed at a portion in the vehicle transverse direction of the top surface portion 13A of the front side member 12. Similarly, the upper side mounting portion 54 in the second embodiment also may be a structure that is disposed at a portion in the vehicle transverse direction of the top surface portion 13A of the front side member 12.

Further, in the first embodiment, the lower side bent portion 22D of the bracket 22 is disposed over substantially the entire width in the vehicle transverse direction of the bottom surface portion 13D of the front side member 12, but the present invention is not limited to this structure. For example, the lower side bent portion 22D of the bracket 22 may be a structure that is disposed at a portion in the vehicle transverse direction of the bottom surface portion 13D of the front side member 12. Similarly, the lower side mounting portion 56 in the second embodiment also may be a structure that is disposed at a portion in the vehicle transverse direction of the bottom surface portion 13D of the front side member 12.

In the first or second embodiment, the rotating mechanism is provided at the mounting portion of the bracket 22 and the like or the collar 52 that is positioned furthest toward the front side, among the plural joining members that join the front side member 12 and the sub-frame 20 at two or more places in the vehicle longitudinal direction. However, the present invention is not limited to this structure. For example, there may be a structure in which the rotating mechanism is provided at a front side joining member that is positioned relatively toward the front side in the vehicle longitudinal direction (but is not limited to being positioned furthest toward the front side), among the plural joining members that join the front side member 12 and the sub-frame 20 at two or more places in the vehicle longitudinal direction.

The disclosure of Japanese Patent Application No. 2014-004600 filed Jan. 14, 2014 is incorporated by reference in its entirety into this specification.

All publications patent applications, and technical standards mentioned in this specification are herein incorporated by reference to the same extent as if each individual publication, patent application, or technical standard was specifically and individually indicated to be incorporated by reference.

What is claimed is:

1. A vehicle lower portion structure, comprising:
a vehicle skeleton member that extends along a vehicle longitudinal direction at a vehicle transverse direction outer side of a vehicle front portion;
a sub-frame that is provided at a vehicle lower side of the vehicle skeleton member, and that includes a side portion extending in the vehicle longitudinal direction;
a plurality of joining members that join the side portion of the sub-frame to the vehicle skeleton member at two or more locations in the vehicle longitudinal direction; and
a rotating mechanism that is provided at a mounting portion of a front side joining member that, among the plurality of joining members, is positioned at a front side in the vehicle longitudinal direction and, when a load from a vehicle front side is applied to the vehicle skeleton member, the rotating mechanism rotates the front side joining member such that an upper side in a vehicle vertical direction of the mounting portion moves relatively toward a vehicle rear side as compared with a lower side thereof,
wherein the rotating mechanism is provided within a cross-section of the vehicle skeleton member, and the rotating mechanism is structured such that a vehicle upper portion side at the mounting portion projects toward a vehicle longitudinal direction front side as compared with a vehicle lower portion side.

2. The vehicle lower portion structure of claim 1, wherein the rotating mechanism is structured such that the vehicle lower portion side at the mounting portion is bent in an L-shape as seen in a vehicle side view.

3. The vehicle lower portion structure of claim 2, wherein the mounting portion includes, at the vehicle lower portion side, a reinforcing portion that extends toward the vehicle rear side; and
the reinforcing portion is superposed on a bottom surface portion of the vehicle skeleton member.

4. The vehicle lower portion structure of claim 1, wherein:
the mounting portion includes, at the vehicle lower portion side, a reinforcing portion that extends toward the vehicle rear side; and
the reinforcing portion is superposed on a bottom surface portion of the vehicle skeleton member.

5. The vehicle lower portion structure of claim 1, wherein:
the front side joining member includes a collar to which is fastened a bolt to attach the side portion of the sub-frame to the vehicle skeleton member, and a bracket that attaches the collar to the vehicle skeleton member; and
the rotating mechanism is provided at the bracket.

6. The vehicle lower portion structure of claim 5, wherein the rotating mechanism includes an upper side bent portion that is bent toward the vehicle front side from an upper end portion of a vertical wall of the bracket and is joined to the vehicle skeleton member, and a lower side bent portion that is bent toward the vehicle rear side from a lower end portion of the vertical wall of the bracket and is joined to the vehicle skeleton member.

7. The vehicle lower portion structure of claim 1, wherein the front side joining member includes a collar that is joined to the vehicle skeleton member and to which is fastened a bolt to attach the side portion of the sub-frame to the vehicle skeleton member; and
the rotating mechanism is provided at an upper portion side and a lower portion side of the collar.

8. The vehicle lower portion structure of claim 7, wherein the rotating mechanism comprises:
an upper side mounting portion that is provided so as to contact or be adjacent to the vehicle front side of an upper end portion of the collar, and that is joined to the vehicle skeleton member; and
a lower side mounting portion that is provided so as to contact or be adjacent to the vehicle rear side of a lower end portion of the collar, and that is joined to the vehicle skeleton member.

9. The vehicle lower portion structure of claim 1, wherein the mounting portion includes, at the vehicle lower portion side, a reinforcing portion that extends toward the vehicle rear side; and
the reinforcing portion is superposed on a bottom surface portion of the vehicle skeleton member.

* * * * *